United States Patent
Ang

(10) Patent No.: US 8,054,362 B2
(45) Date of Patent: *Nov. 8, 2011

(54) INCREASING READOUT SPEED IN CMOS APS SENSORS THROUGH BLOCK READOUT

(75) Inventor: Lin-Ping Ang, Montrose, CA (US)

(73) Assignee: Round Rock Research, LLC, Mt. Kisco, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/571,460

(22) Filed: Oct. 1, 2009

(65) Prior Publication Data

US 2010/0078544 A1    Apr. 1, 2010

Related U.S. Application Data

(63) Continuation of application No. 10/983,083, filed on Nov. 8, 2004, now Pat. No. 7,671,914, which is a continuation of application No. 09/274,739, filed on Mar. 23, 1999, now Pat. No. 6,847,399.

(60) Provisional application No. 60/079,046, filed on Mar. 23, 1998.

(51) Int. Cl.
*H04N 3/14* (2006.01)
*H04N 5/335* (2011.01)

(52) U.S. Cl. ........ 348/308; 348/302; 348/304; 348/307; 348/241; 348/246; 348/294; 250/208.1

(58) Field of Classification Search .............. 348/308, 348/302, 304, 307, 241, 248, 294; 250/208.1
See application file for complete search history.

(56) References Cited

U.S. PATENT DOCUMENTS

| 4,122,311 A | 10/1978 | Klatt et al. |
| 4,737,854 A | 4/1988 | Tandon et al. |
| 4,835,404 A | 5/1989 | Sugawa et al. |
| 4,914,519 A | 4/1990 | Hashimoto et al. |
| 5,081,536 A | 1/1992 | Tandon et al. |
| 5,148,268 A | 9/1992 | Tandon et al. |
| 5,172,249 A | 12/1992 | Hashimoto |
| 5,317,406 A | 5/1994 | Kobayashi et al. |
| 5,434,619 A | 7/1995 | Yonemoto |

(Continued)

FOREIGN PATENT DOCUMENTS

EP    0 616 464 A2    9/1994

(Continued)

OTHER PUBLICATIONS

Mendis et al., "CMOS Active Pixel Image Sensor," IEEE Transactions on Electron Devices, vol. 41, No. 3, Mar. 1994.

(Continued)

*Primary Examiner* — Nicholas G Giles
*Assistant Examiner* — Antoinette T Spinks
(74) *Attorney, Agent, or Firm* — Lerner, David, Littenberg, Krumholz & Mentlik, LLP

(57) ABSTRACT

A method and associated architecture for dividing column readout circuitry in an active pixel sensor in a manner which reduces the parasitic capacitance on the readout line. In a preferred implementation, column readout circuits are grouped in blocks and provided with block signaling. Accordingly, only column output circuits in a selected block significantly impart a parasitic capacitance effect on shared column readout lines. Block signaling allows increasing pixel readout rate while maintaining a constant frame rate for utility in large format high-speed imaging applications.

42 Claims, 6 Drawing Sheets

U.S. PATENT DOCUMENTS

| | | | |
|---|---|---|---|
| 5,461,425 A | 10/1995 | Fowler et al. | |
| 5,471,515 A | 11/1995 | Fossum et al. | |
| 5,493,423 A | 2/1996 | Hosier | |
| 5,499,215 A * | 3/1996 | Hatta | 365/230.03 |
| 5,550,653 A | 8/1996 | Tewinkle et al. | |
| 5,631,704 A | 5/1997 | Dickinson et al. | |
| 5,638,121 A | 6/1997 | Hosier et al. | |
| 5,739,562 A | 4/1998 | Ackland et al. | |
| 5,789,736 A | 8/1998 | Kawahara | |
| 5,790,191 A | 8/1998 | Zhang | |
| 5,841,126 A | 11/1998 | Fossum et al. | |
| 5,854,656 A | 12/1998 | Noggle | |
| 5,872,470 A | 2/1999 | Mallinson et al. | |
| 5,894,431 A | 4/1999 | Price | |
| 5,933,189 A | 8/1999 | Nomura | |
| 5,965,871 A * | 10/1999 | Zhou et al. | 250/208.1 |
| 5,973,311 A | 10/1999 | Sauer et al. | |
| 6,141,045 A | 10/2000 | Tewinkle et al. | |
| 6,320,616 B1 | 11/2001 | Sauer | |
| 6,366,320 B1 | 4/2002 | Nair et al. | |
| 6,369,853 B1 | 4/2002 | Merrill et al. | |
| 6,377,304 B1 | 4/2002 | Saitoh | |
| 6,483,541 B1 | 11/2002 | Yonemoto et al. | |
| 6,512,546 B1 | 1/2003 | Decker et al. | |
| 6,552,324 B1 | 4/2003 | Kothari et al. | |
| 6,661,457 B1 | 12/2003 | Mathur et al. | |
| 6,697,108 B1 | 2/2004 | Chen et al. | |
| 6,747,695 B1 | 6/2004 | Afghahi | 348/241 |
| 6,784,928 B1 | 8/2004 | Sakurai et al. | |
| 6,831,690 B1 | 12/2004 | John et al. | |
| 6,980,243 B2 | 12/2005 | Miyawaki et al. | |
| 7,154,548 B2 | 12/2006 | Liu | 348/302 |
| 2002/0021614 A1 * | 2/2002 | Kim et al. | 365/230.03 |

FOREIGN PATENT DOCUMENTS

| | | |
|---|---|---|
| JP | 63-318875 A | 12/1988 |
| JP | 4-4682 A | 1/1992 |

OTHER PUBLICATIONS

Mendis et al., "Progress in CMOS Active Pixel Image Sensors," Proceedings of the SPIE vol. 2172, Charge-Coupled Devices and Solid State Optical Sensors IV (1994).

Niewiadomski et al., "CMOS Read-Out IC with Op-Amp Pixel Amplifier for Infrared Focal Plane Arrays," Proceedings—Tenth Annual IEEE International ASIC Conference and Exhibit, pp. 69-73, 1997.

J. W. Tippie, "VXI Data Acquisition Handbook," Revision 1.3, KineticSystems Corporation, Feb. 16, 1998.

* cited by examiner

INCREASING READOUT SPEED IN CMOS APS SENSORS THROUGH BLOCK READOUT

CROSS REFERENCE TO RELATED APPLICATIONS

This application is a continuation of application Ser. No. 10/983,083, filed Nov. 8, 2004, now U.S. Pat. No. 7,671,914, which is a continuation of application Ser. No. 09/274,739, filed Mar. 23, 1999 (now U.S. Pat. No. 6,847,399), which claims the benefit of U.S. Provisional Application No. 60/079,046, filed on Mar. 23, 1998. Each of these disclosures are incorporated herein by reference.

FIELD OF THE INVENTION

The present invention relates to CMOS image sensors, and more particularly to methods and associated architectures for reading out data, from such a sensor.

BACKGROUND

The advent of HDTV and other high-end digital imaging systems is increasing demand for large format high speed sensors. CMOS active pixel image sensors which have low power dissipation, are low cost and highly reliable, and which can typically be configured in a single chip solution, are increasingly being developed for large format high speed imaging applications. Large format sensors usually require an image pixel array of at least 1024×1024 pixels in size. Unfortunately, as the image array is made larger, it becomes difficult to increase pixel readout rate without also increasing frame rate because of parasitic capacitance limitations in current architectures.

SUMMARY

The present disclosure describes a method and associated architecture for dividing column readout circuitry in an image sensor in a manner which reduces the parasitic capacitance on the readout line. In a preferred implementation, column readout circuits are grouped in blocks and provided with block signaling. Accordingly, only column readout circuits in a selected block significantly impart a parasitic capacitance effect on shared column readout lines at any point in time. Block signaling was found to increase pixel readout rate while maintaining a constant frame rate for utility in large format high-speed imaging applications.

In accordance with a preferred embodiment, by mathematically modeling the load capacitance and the effective RC constant seen by any column output stage at a particular time and by using a differentiated derived equation, a desirable optimum number of connections per block as well as a desired number of blocks for a given size of column readout circuits can be easily determined.

DETAILED DESCRIPTION OF THE PREFERRED EMBODIMENTS

Figure 1:
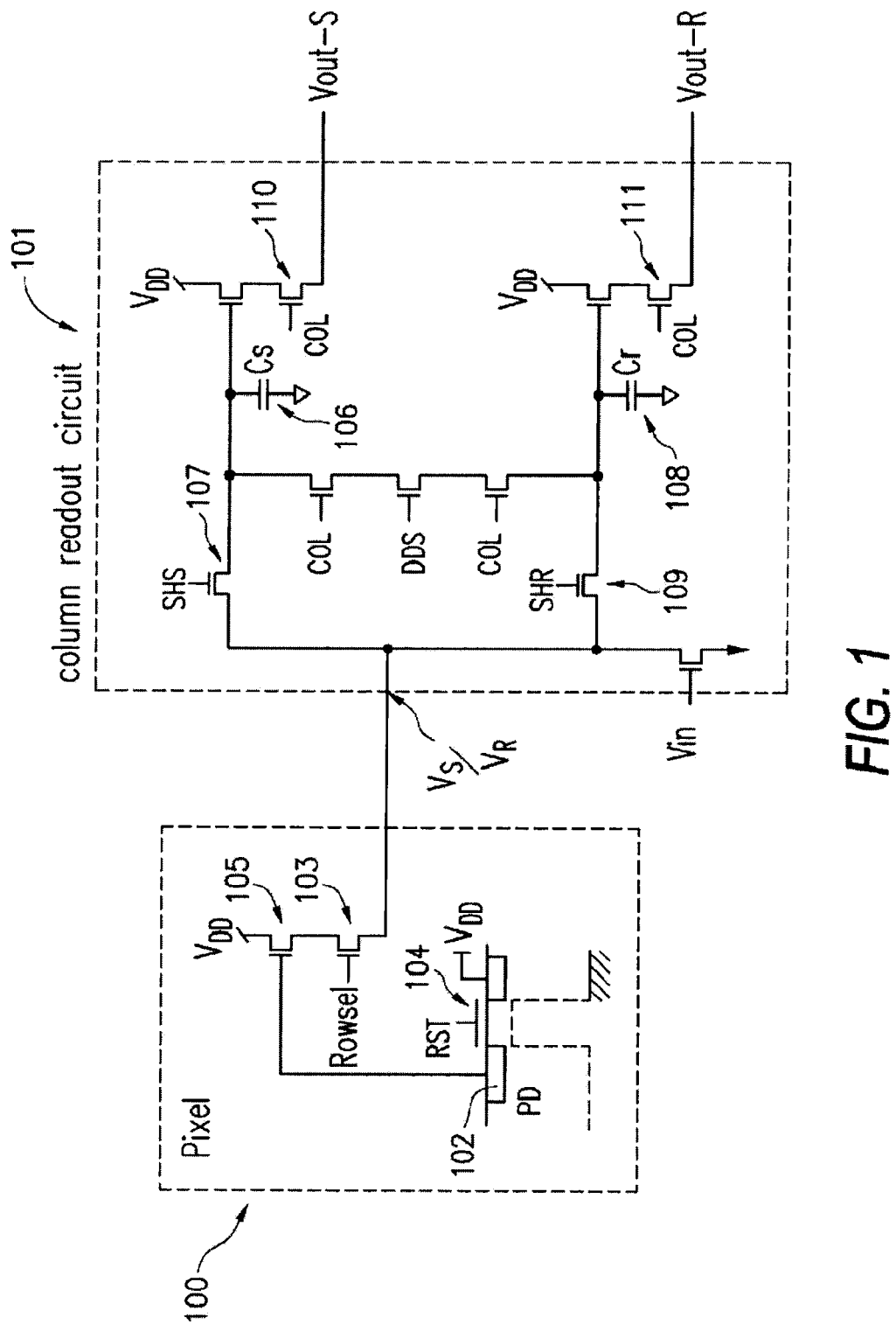
FIG. 1 shows a pixel and corresponding column readout circuit in an active pixel sensor.

A schematic diagram of a conventional CMOS active pixel 100 and associated column readout circuit 101 is shown in FIG. 1. Incident photons on the pixel 101 generate electrons that are collected in the floating diffusion area 102. The charge is buffered by an in-pixel source follower 105. A number of pixels are typically arranged horizontally to form a row of pixels and also vertically to define a column of pixels. Row selection transistor 103 is enabled to allow charge from a given row of pixels to be selectable for readout.

A more detailed discussion of the general principles of pixel readout is provided in U.S. Pat. No. 5,841,126.

While the illustrative implementation shows a photodiode pixel, it should be understood that a photogate, phototransistor or the like could be used instead.

During imaging, the photodiode floating diffusion area 102 is first reset. This is achieved by pulsing a gate of reset transistor 104 to a high voltage, for example VDD. After a period of time, the voltage of the floating diffusion area 102 drops to reflect the number of electrons accumulated in the Floating diffusion area 102. The voltage $V_S$ of the floating diffusion area is then read out from the pixel 100 into the column readout circuit 101 using source follower 105 within pixel 100. Voltage $V_S$ is then sampled onto storage capacitor $C_S$ 106 by enabling the sample-hold signal (SHS) transistor 107.

Figure 2:
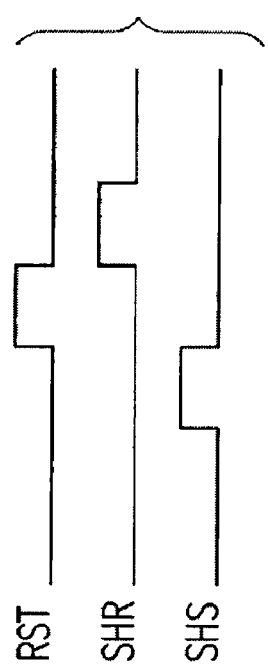
FIG. 2 shows the timing for a photodiode pixel readout operation.

After the signal charge $V_s$ is read out, the pixel 100 is then reset and the gate of reset transistor 104 is again pulsed to a high voltage. The resultant voltage $V_R$ of Floating diffusion area 102 is then read out to the column readout circuit 101 as before. This time the voltage $V_R$ is sampled onto storage capacitor $C_R$ 108 by enabling the sample-hold reset (SHR) transistor 109. FIG. 2 shows the timing for the above photodiode operation.

Figure 3:
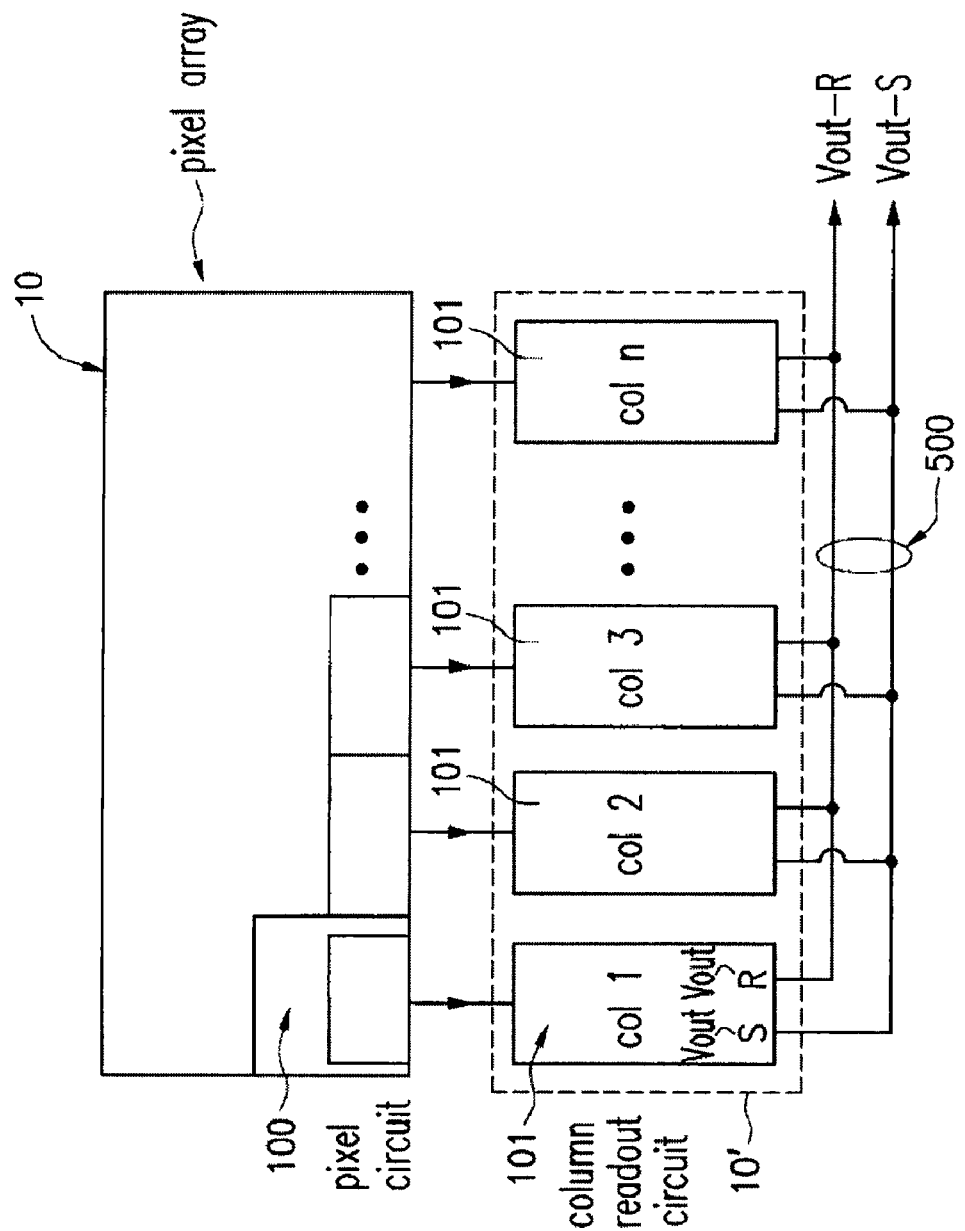
FIG. 3 shows a block diagram of a CMOS active pixel sensor including an array of pixels and corresponding column readout circuits, all coupled to a pair of shared readout lines.

The voltage difference between the voltages stored in the two capacitors, $C_S$ 106 and $C_R$ 108 is indicative of the charge collected in the floating diffusion area 102. Typically, all the pixels 100 in a same row are processed simultaneously. The signals are sampled onto capacitors $C_S$ and $C_R$ in their respective column readout circuits collectively arranged beneath the row (or multiple rows: array 10) of pixels. After a row sampling process is complete, voltage signal Vout_S, Vout_R in each column is read out successively by successively enabling the associated n-channel column selection transistors 110, 111. A high level block diagram of an array of pixels 10 and associated linear array 10' of corresponding column readout circuits 101, arranged in parallel fashion, is shown in FIG. 3. The outputs of Vout_R and Vout_S of column readout circuits 101 each share a common readout line.

Figure 4:
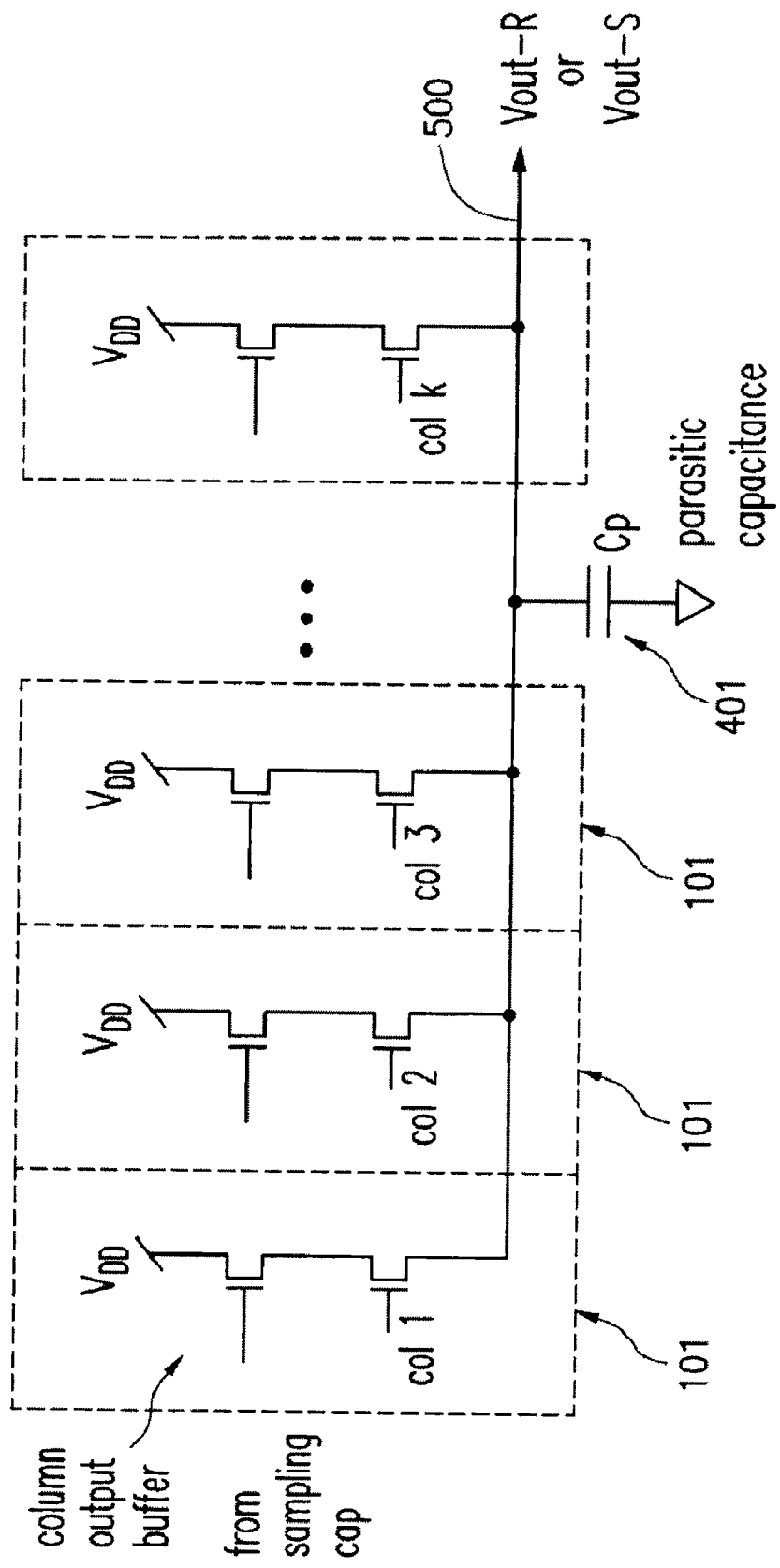
FIG. 4 shows a simplified schematic diagram of a portion of an output stage for each of plural column readout circuits and the parasitic capacitance effects contributed thereby.

FIG. 4 is a simplified partial schematic diagram of the respective output stages of the column readout circuits 101 in a linear array of pixels 10'. Each column output stage contributes a parasitic capacitance resulting in an effective load capacitance of Cp, represented by capacitor 401. Assuming Ci to be the parasitic capacitance contributed by each column circuitry, total parasitic capacitance and total RC time constant (charge and discharge) turn-on/off settling time, may then be represented as follows:

$$Cp1 = mCi \quad \text{eq. (1)}$$

$$RCp1 = mRCi \quad \text{eq. (2),}$$

where R is the built-in resistance associated with each of column select transistors 110, 111 in the ON state, and m is the total number of column readout circuits 101 in a column-addressable row.

As explained above, column readout circuit 101 output signals (Vout_S and Vout_R) are each connected to a pair of corresponding shared column readout lines. An image sensor with a horizontal resolution of 1000 pixels could theoretically result in the column output stage of a selected column readout circuit 101 having to drive the load capacitance associated with the other 999 columns. The parasitic capacitance in such a case could effectively be in the tens or even hundreds of picofarads.

A larger capacitance requires longer time to charge the capacitance to a desired voltage value, and results in a greater RC time constant which translates into greater settling time. To increase pixel readout rate at a predetermined maximum frame rate necessarily involves minimizing the effective load capacitance seen by a selected column output buffer (transistor 110, 111).

Settling time may be improved by increasing the biasing current on the column output buffer. The time to charge up a capacitance to a certain voltage is well known and may be represented by the following equation:

$$I_{avg} = C \frac{dV}{dt}$$

$$dt = \frac{C}{I_{avg}} dV$$

Increasing the current would mean more power dissipation since $P_{diss} = V*I$. For portable video systems, power dissipation is a key issue because higher power dissipation would reduce the lifetime of the battery. The present inventor has determined this not a desirable or optimum solution.

Figure 5:
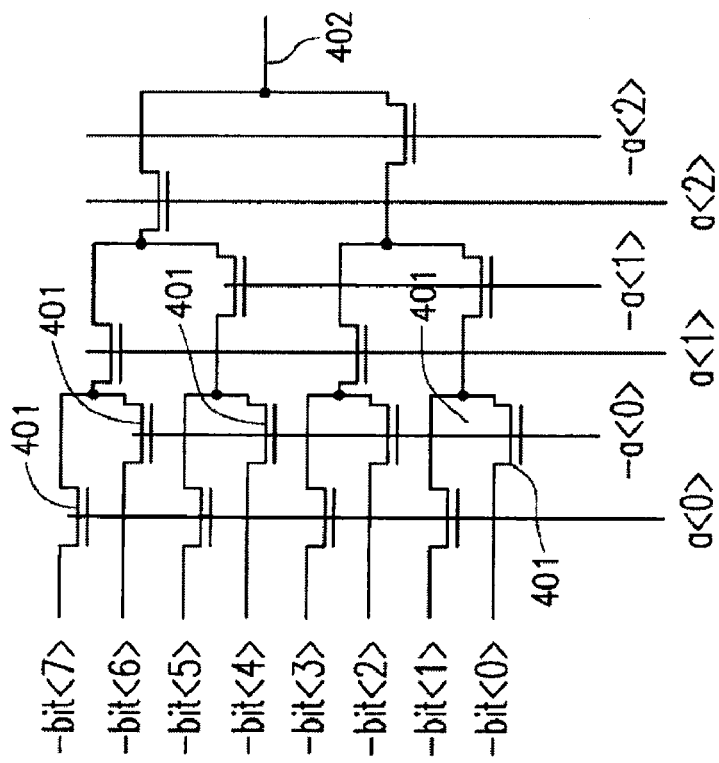
FIG. 5 shows a tree-style column decoder and multiplexer.

Settling time may also be reduced by reducing the effective load capacitance on the column output buffer. A technique for reducing effective load capacitance for faster readout is called tree-style column decoding. An example of a RAM tree-style column decoder and multiplexer is shown in FIG. 5. Data bit lines are coupled to a pool of switches (transistors 401) which are selectively enabled to drive only a desired data bit through to a shared bit line 402. In the configuration shown, a selected bit line receives a parasitic capacitance contribution from at least four transistors. With such a scheme, however, the overall effective capacitance seen on the shared bit line 402 can be reduced by as much as half that which might be imparted were all eight bit lines to be directly coupled to shared bit line 402 by only a single parallel bank of eight transistors.

Tree-style column decoding reduces the effective capacitance seen by each bit output line.

The present inventor has discovered that by splitting the column circuitry into different blocks, as will be explained in greater detail below, the readout bus capacitance seen by a currently selected column output stage could be significantly reduced beyond that possible by known techniques.

In accordance with a preferred embodiment, the load capacitance is mathematically modeled. The effective RC constant seen by any column output stage at a particular time is determined. By using a differentiated derived equation, a desirable optimum number of connections per block as well as a desired number of blocks for a given size of column readout circuits can be easily determined from this equation.

Figure 6:
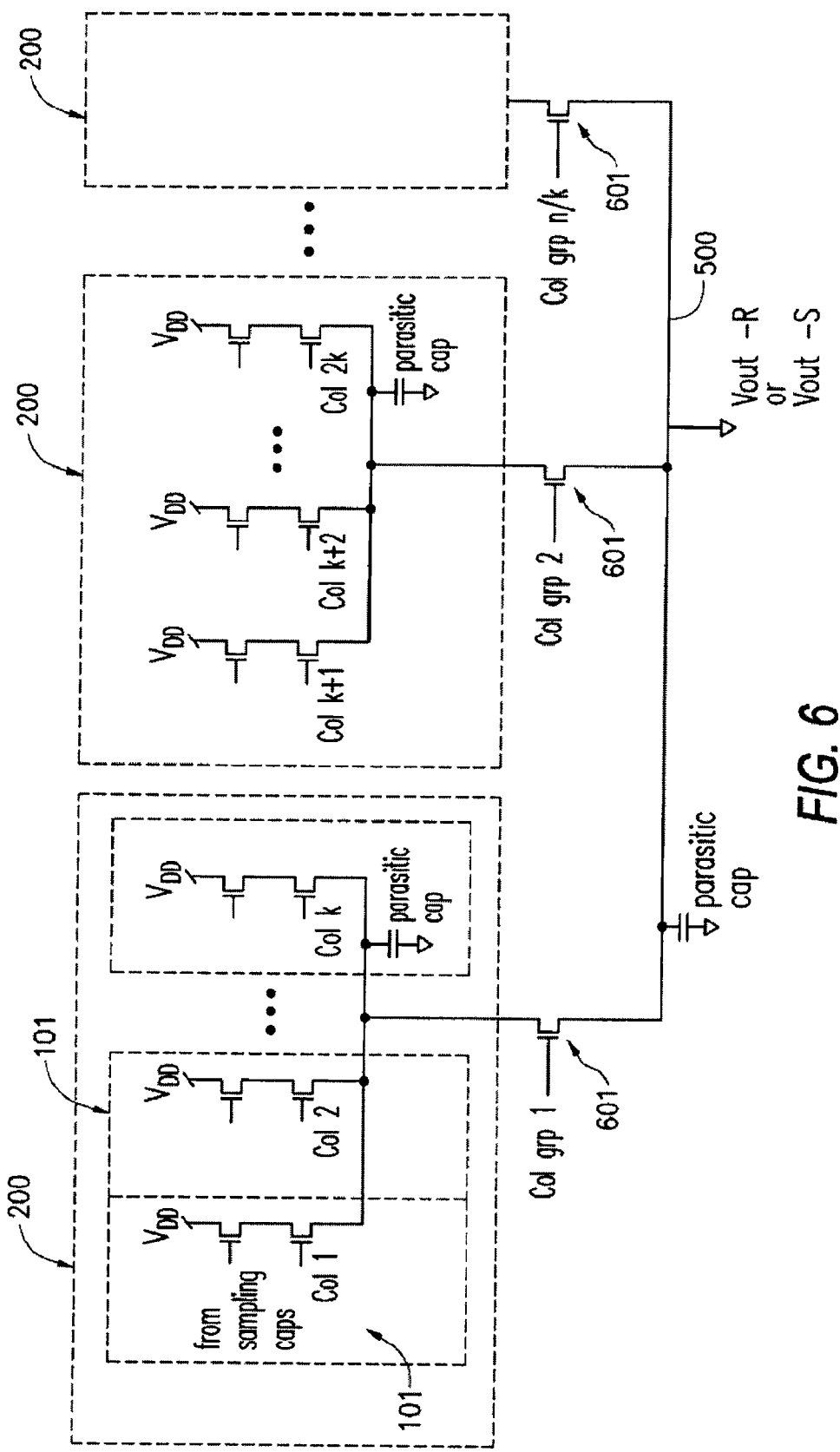
FIG. 6 shows the grouping of column readout circuits in blocks of k across an m-pixel linear array.

An improved configuration for coupling the column output stages resulting in reduced parasitic capacitance effects is illustrated in FIG. 6. FIG. 6 shows the column readout circuits 101. Only one portion of the respective column output stage is shown. These are logically divided up into blocks 200, each comprised of k contiguous column readout circuits. A set of block switches (n channel transistors) 601 are used to select among the blocks 200. Each switch 601 functions as a block select switch allowing the column readout circuits 101 in a given block to become actively coupled to the shared column readout line 500. Block switches 601 are used to select among the blocks 200 every time an associated column readout circuit 101 is to be turned ON. Once a column readout circuit 101 is selected for readout, its corresponding block switch 601 is also selected, but none of the other block switches are selected. Those blocks 200 which are not selected prevent or block associated column readout circuits from imparting a parasitic capacitance on the shared readout line 500, and/or on the column output stage of the currently active column readout circuit.

Block switches 601 also collectively impart a proportionate parasitic capacitance on the currently active column readout circuit, regardless of whether or not they are connected. Thus, in an arrangement of 64-wide block column readout circuits servicing a 1024-pixel wide row, there would be a total 1024/64=8 blocks. Each of the eight block switch transistors 601 would impart a parasitic capacitance of its own. This capacitance of eight transistors, however, is much less than the collective capacitance of 1024 non-blocked column select transistors. In this regard, it might be said that block select switches 601 function as parasitic capacitance blockers.

The present inventor has determined that the optimum number of column readout circuits 101 per block 200 (i.e., the optimum value of k) for a given size pixel configuration may be calculated from the following mathematical quadratic relation, $$C_{p2} = (k+2+m/k)C_i, \quad \text{eq. (3)}$$

for k (n-channel) column select transistors (110 or 111) and m/k groups, where m is the total number of column readout circuits 101. The numeral 2 constant is derived from the parasitic capacitance of the group selection (nmos) transistor of the particular block being selected. This is based on a previous assumption that Ci is the parasitic capacitance of the source/drain diffusion of the nmos selection transistor.

Minimizing $C_{p2}$ in eq. (3) by differentiating $C_{p2}$ with respect to k and equating it to zero, we get:

$$(1-m/k^2)C_i = 0, \quad \text{eq. (4)}$$

solving for k, $$k = m^{1/2},$$

then substituting the value of k back into eq. (3), we get:

$$C_{p2} = (2m^{1/2}+2)C_i. \quad \text{eq. (5)}$$

Now, since each block switch transistor 601 is in series with a selected column output buffer (transistors 110 or 111), the result is a doubling in the effective resistance R imparted on each associated Vout_S, Vout_R column readout line 500.

The doubled resistance impacts doubly on the RC time constant settling time. This doubled resistance may be mathematically represented in terms of a relevant time constant from equations (2) and (3) as:

$$RC_{p2} = 2 \times (2m^{1/2} + 2) * RC_I. \qquad \text{eq. (6)}$$

From the above, a parasitic capacitance improvement (or reduction) between $C_{p1}$ (without block switching) and $C_{p2}$ (with block switching) may be expressed as a ratio $C_{p1}:C_{p2}$ as $$m:2m^{1/2}+2, \qquad \text{eq. (7)}$$

for large m, $2m^{1/2}+2$, approximates to $2m^{1/2}$, substituting back in eq. (7), we get a ratio of
$m:2m^{1/2}$, which equates to a ratio of $m^{1/2}:2$.

Thus, for large m (e.g, 512, 1024, or greater), parasitic capacitance is effectively reduced by a factor of about $m^{1/2}/2$. In a 1024-row architecture having block switching and an optimum block size of 32 ($k=m^{1/2}$), a parasitic capacitance reduction of 16 ($=m^{1/2}/2=32/2$) may be realized over the case where no block switching is utilized.

A similar analysis may be used to determine RC time constant improvement (or reduction) in the cases where there is no block switching ($RC_1$) versus the case where block switching ($RC_2$) is provided.

Representing the two cases by $RC_{p1}:RC_{p2}$, from equations (6) and (7), we get $$m:2 \times (2m^{1/2}+2). \qquad \text{eq. (8)}.$$

Here again, for large m,
$2m^{1/2}+2$, approximates to $2m^{1/2}$, substituting back in eq. (8), the ratio can be expressed as
$m:4m^{1/2}$,
which equates to a ratio of $m^{1/2}:4$.

Thus it is shown that block switching can reduce the effective RC constant by a factor of about $m^{1/2}/4$. Accordingly, for a pixel array of 1024×1024, the parasitic capacitance may be reduced by a factor of 8×2 ($=1024^{1/2}/4\times2$), while the RC time constant is reduced by a factor of 8, by utilizing block switching. In a 32 ($1024^{1/2}$) block orientation, each column output stage is imparted an effective loading equivalent to having 1024/16=64 columns connected together.

Figure 7:
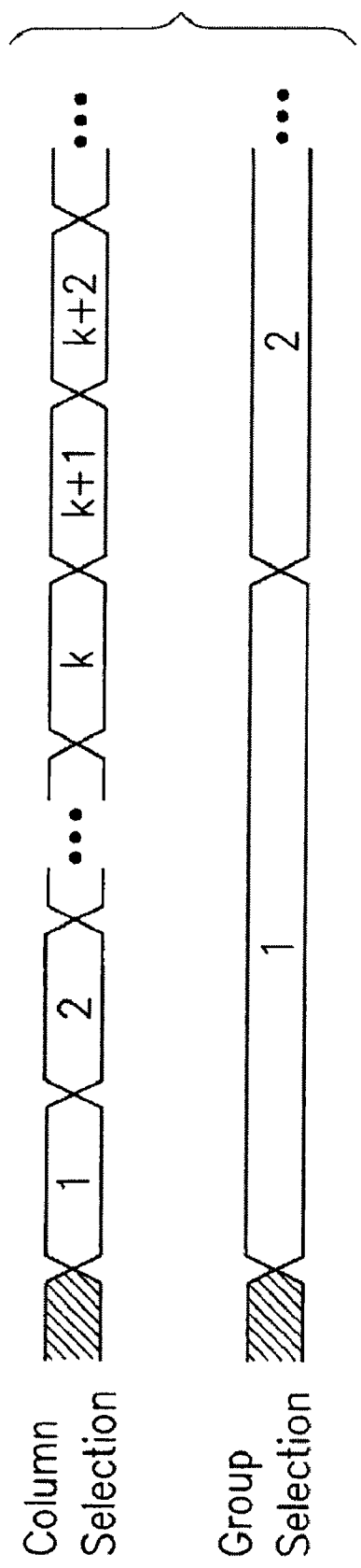
FIG. 7 shows the timing for column readout and column group selection in accordance with a preferred implementation of the present disclosure.

FIG. 7 shows the timing for effecting column selection in block group fashion in accordance with a preferred implementation in which it is contemplated that the column read out circuits 101 in a given block will be readout first. After all the columns in the block have been read out, the associated block switch is disabled, and the block switch associated with the next column readout circuit to be read out is enabled (turned ON).

The present implementation has been described having only one level of block switches. Another embodiment uses multiple levels of cascaded stages of block switching to further reduce the effective parasitic capacitance seen by a selected column output stage.

In summary, the present solution provides a way for reducing the effective load capacitance thereby allowing for an increase in pixel readout rate without any increase in power dissipation. It is contemplated however that the present solution also allows for a way to improve (reduce) power dissipation in applications where a low pixel readout is desirable.

As should be readily apparent from the above discussion of the preferred embodiments, block switching provides additional advantages beyond those in conventional tree-style decoding. A typical tree-style single stage implementation decoding method reduces the effective load capacitance by a factor of 2. For n cascaded stages, the load capacitance is reduced by a factor of $2^n$ at the expense of very high circuit complexity. The non-cascaded system of FIG. 6 with a large image array with a horizontal resolution of 1024 could have its effective capacitance reduced by a factor of 16.

This system can also increase the pixel readout rate (due to faster settling time) without any increase in the biasing current of the column output stages, and without introducing substantial circuit complexity to the overall active pixel sensor column readout architecture.

Although only a few embodiments have been described in detail, those having ordinary skill in the art would certainly understand that many modifications are possible in the preferred embodiment without departing from the teachings thereof. For example, although the block switching is described in terms of "rows", the blocks could be columns or any other shape of blocks.

All such modifications are intended to be encompassed by the following claims.

What is claimed is:

1. A CMOS active-pixel image sensor, comprising:
   a pixel array arranged in rows and columns comprising a plurality of pixels, each pixel comprising a photosensor and a source follower transistor; and
   column selection circuitry connecting the pixel array to a master output bus and dividing the columns of the pixel array into a plurality of blocks, wherein the plurality of blocks comprises greater than 8 blocks and each of the plurality of blocks comprises a respective plurality of consecutive columns, the column selection circuitry comprising:
   column output circuits connecting the columns in each block to a respective one of a plurality of block output lines;
   block select switches connecting the block output lines to the master output bus; and
   control circuitry connected to the block select switches operable to actively couple a single one of the blocks to the master output bus at a time.

2. The CMOS active pixel image sensor of claim 1, wherein each of the column output circuits is operable to generate at least two respective signals which together are indicative of a single respective pixel value sampled from the selected row of pixels in the array.

3. The CMOS active-pixel image sensor of claim 2, wherein at least one of the two respective signals is analog.

4. A method comprising:
   sampling a pixel in a selected row of a CMOS pixel array having pixels arranged in rows and columns;
   actively coupling a single one of a plurality of greater than two block output lines to an array readout bus at a time, each of the block output lines being coupled to a respective plurality of greater than two adjacent columns of the pixel array; and
   reading out a pixel value corresponding to the pixel in the selected row via the array readout bus, wherein reading out the pixel value comprises reading out a first value corresponding to the pixel value and reading out a second value corresponding to the pixel value.

5. The method of claim 4, wherein reading out the first value is done via a first line of the array readout bus and reading out a second value is done via a second line of the array readout bus.

6. The method of claim 5, wherein at least one of the first and second values is an analog value.

7. The method of claim 4, further comprising actively coupling a single one of the respective plurality of adjacent columns to a respective one of the block output lines at a time.

8. A CMOS active pixel image sensor, comprising:
a pixel array comprising pixels including in-pixel buffer transistors, wherein the pixels are arranged in rows and columns and each of the pixels comprises a respective photosensor;
column output lines, each of the column output lines coupled to at least one respective column of pixels of the array;
first shared block lines;
column output circuits to produce signals corresponding to pixel values generated by the pixels of the array, each of the column output circuits coupled to at least one respective column output line, wherein the column output circuits are arranged in blocks, and each of the blocks comprises a respective one of the first shared block lines coupled to a respective plurality of the column output circuits of a respective block;
first column output select switches to enable first signals to be selectively transferred from the column output circuits to the first shared block lines, wherein each of the column output circuits comprises a respective one of the first column output select switches;
a first shared readout line; and
at least 8 first block select switches, each of the first block select switches coupled between a respective first shared block line of a respective block and the first shared readout line to enable the first signals to be selectively transferred from each respective first shared block line of each respective block to the first shared readout line, wherein only a single one of the first block select switches is to be activated at a time.

9. The CMOS active pixel image sensor of claim 8, wherein the pixels further include row select transistors.

10. The CMOS active pixel image sensor of claim 8, wherein the first column output select switches comprise n-channel transistors having first source/drain electrodes coupled to receive the first signals, second source/drain electrodes coupled to provide the first signals to the first shared block lines, and gate electrodes coupled to receive column output select signals.

11. The CMOS active pixel image sensor of claim 8, wherein only a single one of the first column output select switches of a corresponding one of the blocks is to be activated at time.

12. The CMOS active pixel image sensor of claim 11, wherein the first column output select switches are configured to be activated successively and only while corresponding ones of the first block select switches are activated.

13. The CMOS active pixel image sensor of claim 8, further comprising:
second shared block lines, wherein each of the blocks comprises a respective one of the second shared block lines coupled to a respective plurality of the column output circuits of a respective block;
second column output select switches to enable second signals to be selectively transferred from the column output circuits to the second shared block lines, wherein each of the column output circuits comprises a respective one of the second column output select switches;
a second shared readout line; and
second block select switches, each of the second block select switches coupled between a respective second shared block line of a respective block and the second shared readout line to enable the second signals to be selectively transferred from each respective second shared block line of each respective block to the second shared readout line, wherein only a single one of the second block select switches is to be activated at a time.

14. The CMOS active pixel image sensor of claim 13, wherein each pixel value generated by each respective pixel in a selected row of the array corresponds to a respective one of the first signals and to a respective one of the second signals.

15. The CMOS active pixel image sensor of claim 13, wherein each pixel value generated by each respective pixel in a selected row of the array corresponds to a difference between a respective one of the first signals and a respective one of the second signals.

16. The CMOS active pixel image sensor of claim 13, wherein only a single one of the first column output select switches is operable to be activated at time, and only a single one of the second column output select switches is operable to be activated at time.

17. The CMOS active pixel image sensor of claim 13, wherein the first column output select switches of a corresponding one of the blocks are operable to be activated successively and only a single one of the first column output select switches of the corresponding one of the blocks is operable to be activated at time.

18. The CMOS active pixel image sensor of claim 8, further comprising first column output buffers to enable the first signals to be transferred to the first column output select switches, wherein each of the column output circuits comprises a respective one of the first column output buffers, and the first column output buffers comprise transistors having gate electrodes coupled to receive the first signals and source/drain electrodes coupled to provide the first signals to the first column output select switches.

19. The CMOS active pixel image sensor of claim 8, wherein the first signals are analog signals.

20. The CMOS active pixel image sensor of claim 8, wherein the first column output select switches comprise n-channel transistors having source/drain electrodes coupled to receive the first signals and gate electrodes coupled to receive column output select signals, and the first block select switches comprise n-channel transistors having source/drain electrodes coupled to receive the first signals from the first column output select switches and gate electrodes coupled to receive block select signals.

21. The CMOS active pixel image sensor of claim 20, wherein the first block select switches are configured to be activated successively.

22. The CMOS active pixel image sensor of claim 8, wherein each of the column output circuits produces at least two respective signals associated with a single respective pixel value generated by a single respective pixel in an activated row of the array during a single row readout.

23. The CMOS active pixel image sensor of claim 8, wherein the respective plurality of the column output circuits of the respective block consists of greater than two column output circuits.

24. The CMOS active pixel image sensor of claim 23, wherein the respective plurality of the column output circuits of the respective block consists of 32 column output circuits.

25. The CMOS active pixel image sensor of claim 8, wherein the first block select switches comprises at least 32 block select switches.

26. An imaging device, comprising:
an array of pixels including a first set of adjacent columns of pixels coupled to a first set of column output circuits to provide a first set of signals, a second set of adjacent columns of pixels coupled to a second set of column output circuits to provide a second set of signals, and a third set of adjacent columns of pixels coupled to a third set of column output circuits to provide a third set of signals, wherein the first, second, and third sets of columns include the same number of columns and are adjacent to each other in the array, and the first, second, and third sets of signals are associated with a row of pixels in the array during a frame readout; and a first block select switch connected between the first set of column output circuits and a master output bus, a second block select switch connected between the second set of column output circuits and the output bus, and a third block select switch connected between the third set of column output circuits and the output bus, wherein the first, second, and third block select switches selectively provide only a single one of the first, second, and third sets of signals to the output bus at a time.

27. The imaging device of claim 26, further comprising:
a fourth block select switch connected between the first set of column output circuits and the output bus, a fifth block select switch connected between the second set of column output circuits and the output bus, and a sixth block select switch connected between the third set of column output circuits and the output bus.

28. The imaging device of claim 27, wherein an indication of pixel values of the row of pixels is provided by at least the first set of signals jointly, the second set of signals jointly, and the third set of signals jointly.

29. The imaging device of claim 28, wherein the indication of pixel values of the row of pixels is provided by calculating a difference between sets of signals.

30. The imaging device of claim 28, wherein at least one of the first, second, and third sets of signals is analog.

31. The imaging device of claim 28, wherein the output bus comprises at least first and second master output lines, and wherein the first, second, and third block select switches are connected to the first output line of the output bus, and the fourth, fifth, and sixth block select switches are connected to the second output line of the output bus.

32. The imaging device of claim 28, wherein the first and fourth column output circuits are configured to store the first set of signals during a first same period of time, the second and fifth column output circuits are configured to store the second set of signals during a second same period of time, and the third and sixth column output circuits are configured to store the third set of signals during a third same period of time.

33. The imaging device of claim 28, wherein the first and fourth sets of column output circuits are configured to provide the first set of signals to the output bus during a first same period of time, the second and fifth block select switches are configured to provide the second set of signals to the output bus during a second same period of time, and the third and sixth block select switches are configured to provide the third set of signals to the output bus during a third same period of time.

34. The imaging device of claim 33, wherein each of the first, second, and third sets of column output circuits comprises more than two respective column output circuits.

35. The imaging device of claim 26, wherein each of the first, second, and third sets of column output circuits comprises more than two respective column output circuits.

36. The imaging device of claim 26, wherein the first block select switch comprises an n-channel transistor connected between the first set of column output circuits and the output bus.

37. The imaging device of claim 36, wherein a source/drain electrode of the transistor is connected to the first set of column output circuits.

38. The imaging device of claim 26, wherein each column output circuit of the first, second, and third sets of column output circuits is configured to store at least two respective values during a same time period, wherein the at least two respective values are indicative of a respective pixel value sampled from the row of pixels in the array during the frame readout.

39. The imaging device of claim 38, wherein the at least two respective values are driven onto the master output bus during a same time period.

40. The imaging device of claim 38, wherein the two respective values are generated at two different times during the frame readout.

41. The imaging device of claim 38, wherein said each column output circuit of the first, second, and third sets of column output circuits further comprises at least two respective capacitors to store the at least two respective values.

42. The imaging device of claim 38, wherein each of the first, second, and third sets of column output circuits comprises more than two respective column output circuits.

* * * * *